United States Patent
Raney

(10) Patent No.: US 7,265,819 B2
(45) Date of Patent: Sep. 4, 2007

(54) SYSTEM AND METHOD FOR PRINT SYSTEM MONITORING

(75) Inventor: Alan L. Raney, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1148 days.

(21) Appl. No.: 09/728,046

(22) Filed: Nov. 30, 2000

(65) Prior Publication Data

US 2002/0063880 A1 May 30, 2002

(51) Int. Cl.
*G06F 15/00* (2006.01)
*G06F 11/00* (2006.01)
*B41B 1/00* (2006.01)

(52) U.S. Cl. .................. 356/1.15; 358/1.14; 358/1.1; 714/100; 714/1; 714/4; 714/46

(58) Field of Classification Search ............... 358/1.15, 358/1.1, 1.9, 1.13, 1.16, 1.17, 1.12, 1.14, 358/2.1, 1.2; 399/8, 9; 714/4, 46, 100, 1
See application file for complete search history.

(56) References Cited

U.S. PATENT DOCUMENTS

| | | | | |
|---|---|---|---|---|
| 5,548,375 A | * | 8/1996 | Mitsuya et al. | 399/9 |
| 6,233,409 B1 | * | 5/2001 | Haines et al. | 399/10 |
| 6,302,527 B1 | * | 10/2001 | Walker | 347/50 |
| 6,556,926 B1 | * | 4/2003 | Haines | 702/34 |
| 6,583,886 B1 | * | 6/2003 | Ochiai | 358/1.15 |
| 6,629,134 B2 | * | 9/2003 | Hayward et al. | 709/217 |
| 6,678,068 B1 | * | 1/2004 | Richter et al. | 358/1.15 |
| 6,678,072 B1 | * | 1/2004 | Matsuoka et al. | 358/2.1 |
| 6,842,898 B1 | * | 1/2005 | Carlson et al. | 718/100 |
| 6,892,317 B1 | * | 5/2005 | Sampath et al. | 714/4 |
| 2002/0080389 A1 | * | 6/2002 | Carney et al. | 358/1.15 |
| 2004/0027611 A1 | * | 2/2004 | Leiman et al. | 358/1.15 |

* cited by examiner

*Primary Examiner*—Kimberly Williams
*Assistant Examiner*—Charlotte M. Baker

(57) ABSTRACT

The present disclosure relates to a system and method for monitoring a print system. The system includes a print system monitor that is adapted for communicating with components of the print system, collecting health information regarding the operation of the print system components, compiling the health information regarding the operation of the print system components, and conveying the health information regarding the operation of the print system components and print system as a whole together to a user. Normally, the print system monitor is in communication with each component of the print system such that information as to operation of each component of the print system can be conveyed together to the user. Operating in this manner, the print system monitor automatically provides important information as to each component of the print system and the system as a whole for purposes of rectifying and avoiding printing problems.

20 Claims, 5 Drawing Sheets

SYSTEM AND METHOD FOR PRINT SYSTEM MONITORING

FIELD OF THE INVENTION

The present disclosure relates to a system and method for print system monitoring. More particularly, the present disclosure relates to system and method for monitoring the health of the various components of a print system and providing this information to a user.

BACKGROUND OF THE INVENTION

Modern print systems typically comprise a plurality of discrete components that cooperate with each other to facilitate printing of various data. For instance, the printing system can comprise a printer driver that runs on a personal computer (PC), a print server to which the PC is connected via a network, and a printer that is similarly connected to the network. Normally, the print server includes a print queue in which the various print jobs are held and ultimately sent to the printer.

As known to those familiar with computers, difficulties can often arise with a printer system that will interrupt or delay printing. For instance, where the printer becomes jammed or runs out of paper or marking agent, the print jobs directed to the printer can be, at least temporarily, halted. As is known in the art, provisions are often made in the print system to warn the print job sender, or network administrator where applicable, of a problem with a printer. For example, the sender may receive a message in the form of a pop-up box that notifies the sender that printing was unsuccessful.

In addition to problems with the printer, problems can also occur with other print system components that can interrupt or delay printing. Unfortunately, most print systems are not configured to communicate such problems with any degree of specificity to the user and/or the network administrator. Instead, the user or network administrator must investigate the health of each component of the print system separately in an effort to determine the root of the problem. Clearly, this process can be time-consuming and tedious, particularly where a large number of PCs and printers are connected in a network.

From the foregoing, it will be appreciated that it would be desirable to have a system and method for print system monitoring that monitors the health of the individual components of the system and that provides the user with an indication of the health of these components and the system as a whole.

SUMMARY OF THE INVENTION

The present disclosure relates to a system and method for monitoring a print system. The system includes a print system monitor that is adapted for communicating with components of the print system, collecting health information regarding the operation of the print system components, compiling the health information regarding the operation of the print system components, and conveying the health information regarding the operation of the print system components and print system as a whole together to a user. Normally, the print system monitor is in communication with each component of the print system such that information as to operation of each component of the print system can be conveyed together to the user. Operating in this manner, the print system monitor automatically provides important information as to each component of the print system and the system as a whole for purposes of rectifying and avoiding printing problems.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
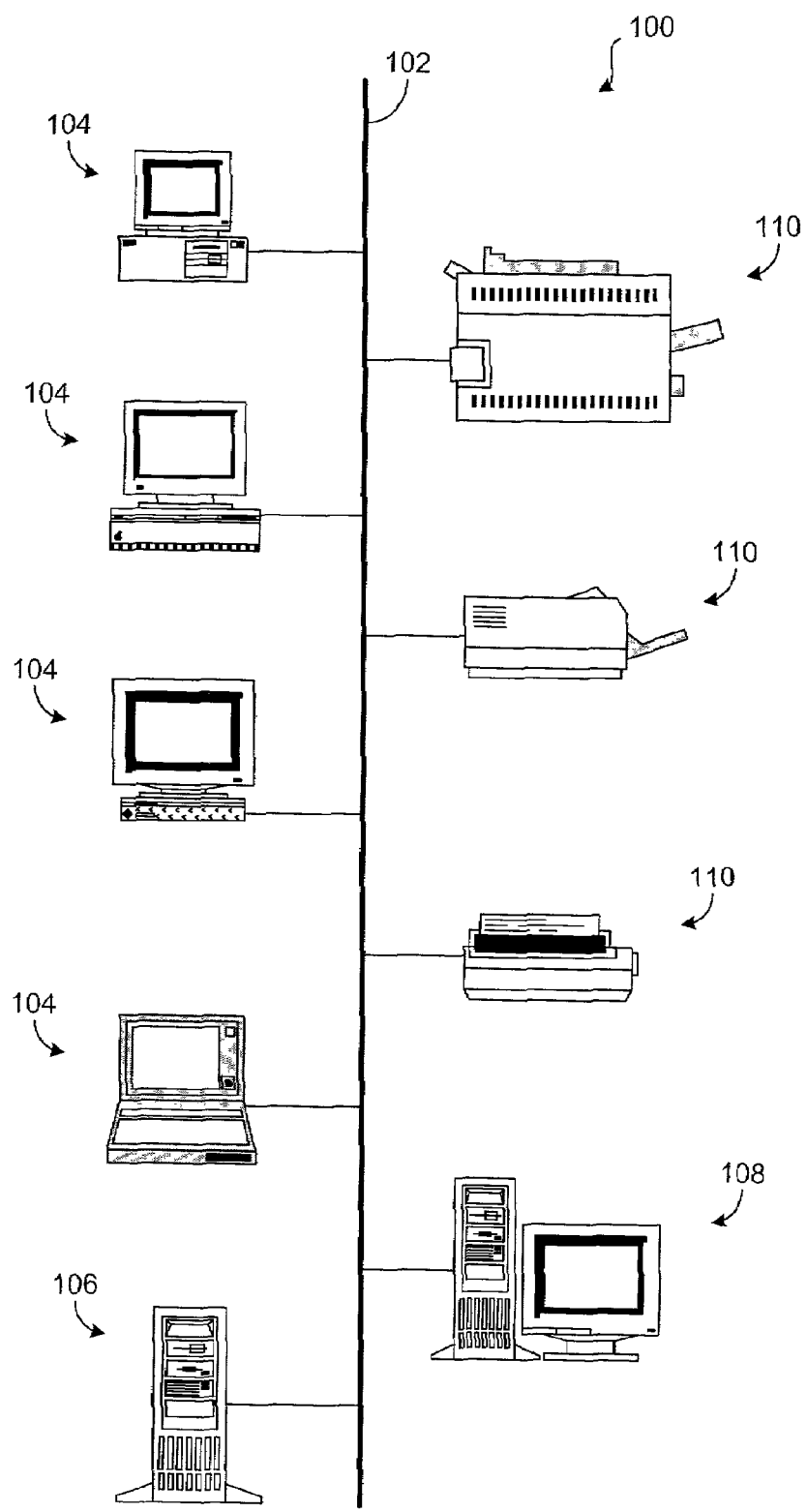
FIG. 1 is a schematic of a network system in which the system and method for print system monitoring can be used.

Referring now in more detail to the drawings, in which like numerals indicate corresponding parts throughout the several views, FIG. 1 illustrates a network system 100 in which the system and method for print system monitoring can be used. As illustrated in this figure, the network system 100 generally comprises a network backbone 102 which serves as the physical connection between the various components of the network. FIG. 1 illustrates several such components for purposes of example. In that these components are exemplary only, it is to be understood that the system and method of the present invention can be used in alternative arrangements.

As indicated in FIG. 1, the network system 100 includes a plurality of computing devices 104 that are physically connected to the network backbone 102. In the typical arrangement, each of these computing devices 104 normally comprises a PC that is capable of running various software applications which comprise print commands. Each computing device 104 normally includes a central processing unit (CPU), storage memory, system memory, and various input and output devices. As is apparent from FIG. 1, the particular nature of the computing devices 104 is unimportant. Therefore, these computing devices 104 can comprise desk top PCs, notebook PCs, workstations, minicomputers, etc.

Further connected to the network backbone 102 is a file server 106 and a print server 108. As will be understood by persons having ordinary skill in the art, each of the file server 106 and print server 108 is similar in nature to the computing devices 104 and therefore comprises a CPU, storage memory, system memory, and various input and output devices. However, each of these servers 106, 108 typically comprises much larger computing and storage capacity than conventional personal computing devices. As will be understood from the discussion that follows, the print server 108 comprises the various software components of the print system and therefore is responsible for a large part of the printing process. Although shown separate from the file server 106, the print server 108 can be incorporated into the file server, if desired. Also connected to the network backbone 102 is a plurality of printers 110. As indicated in FIG. 1, the particular configuration of the printers 110 is unimportant, each printer comprising substantially any device capable of producing a hard copy of data electronically transmitted thereto.

Figure 2:
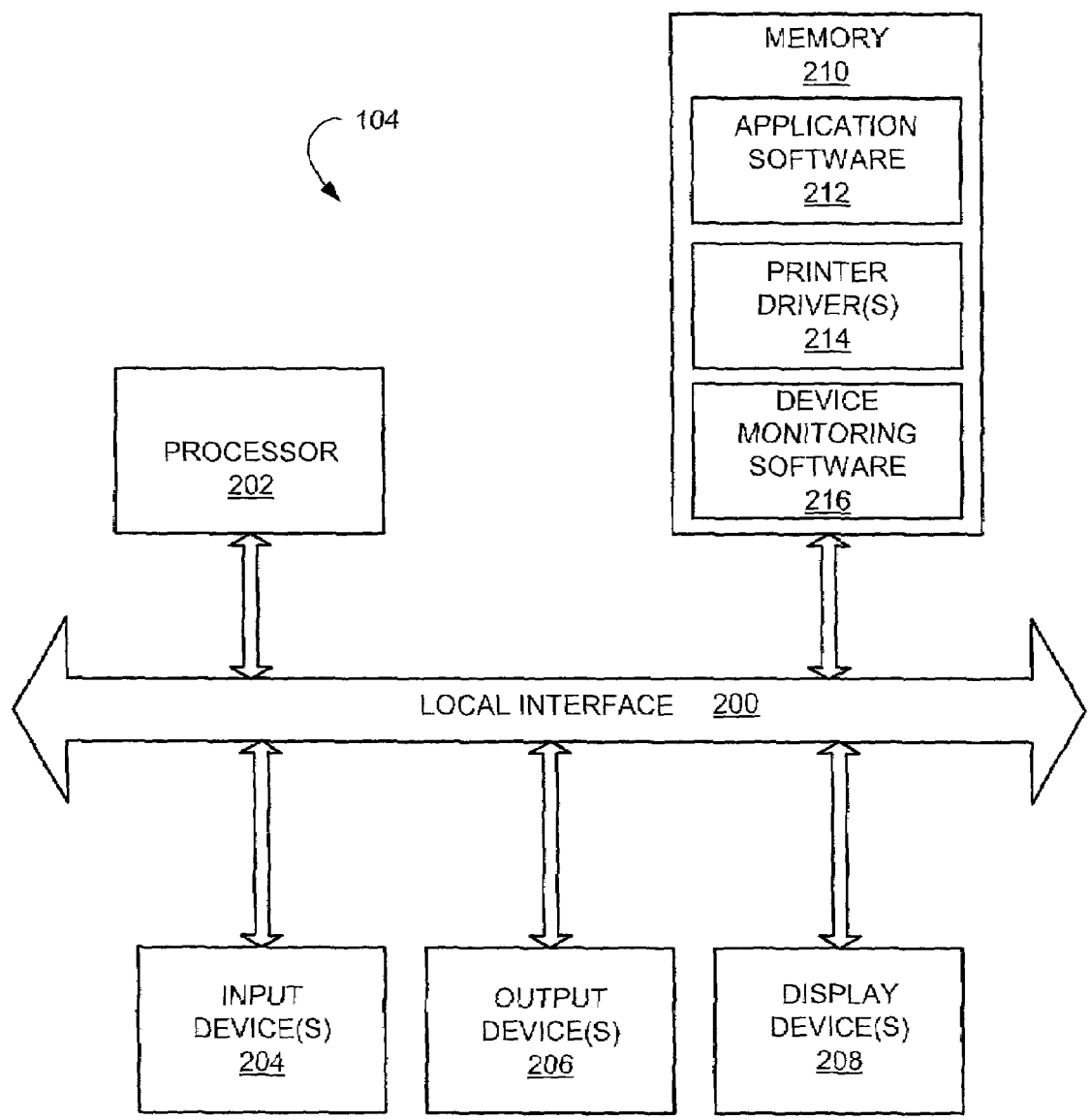
FIG. 2 is a block diagram of a PC connected to the network system of FIG. 1.

FIG. 2 illustrates an example configuration of a computing device 104 shown in FIG. 1. As indicated in FIG. 2, the computing device 104 normally comprises a local interface 200 to which a processor 202, input device(s) 204, output device(s) 206, and display device(s) 208 are connected. By way of example, the processor 202 can comprise the CPU of the computing device 104, the input device(s) 204 can comprise a keyboard and/or mouse, the output device(s) 206 can comprise various interfaces for outputting information from the computing device, and the display device(s) 208 can include a monitor or display screen of the computing device. In addition to these components, the computing device 104 normally further includes a memory 210. As will be understood by persons having ordinary skill in the art, the memory 210 can comprise storage memory as well as system memory. Accordingly, the memory 210 can include one or more hard drives as well as random access memory (RAM).

As indicated in FIG. 2, the memory 210 normally at least includes application software 212, print driver(s) 214, and device monitoring software 216. By way of example, the application software 212 can comprise various user applications such as a word processor, spread sheet, graphics package, or substantially any other application with which hard copies of data can be generated. The printer driver(s) 214 comprise the basic software requirement for low level communications between the computing device 104 and the various printers 110 available to the computing device. By way of example, the computing device 104 can comprise a separate printer driver 214 for each of the three printers 110 illustrated in FIG. 1. As known in the art, the driver(s) 214 reconfigure the application data into a format that is recognizable by the particular printer to which the data is directed. The device monitoring software 216 comprises the software that monitors functioning of the computing device 104. For instance, the device monitoring software 216 can be configured to monitor communications sent by and to the computing device 104.

Figure 3:
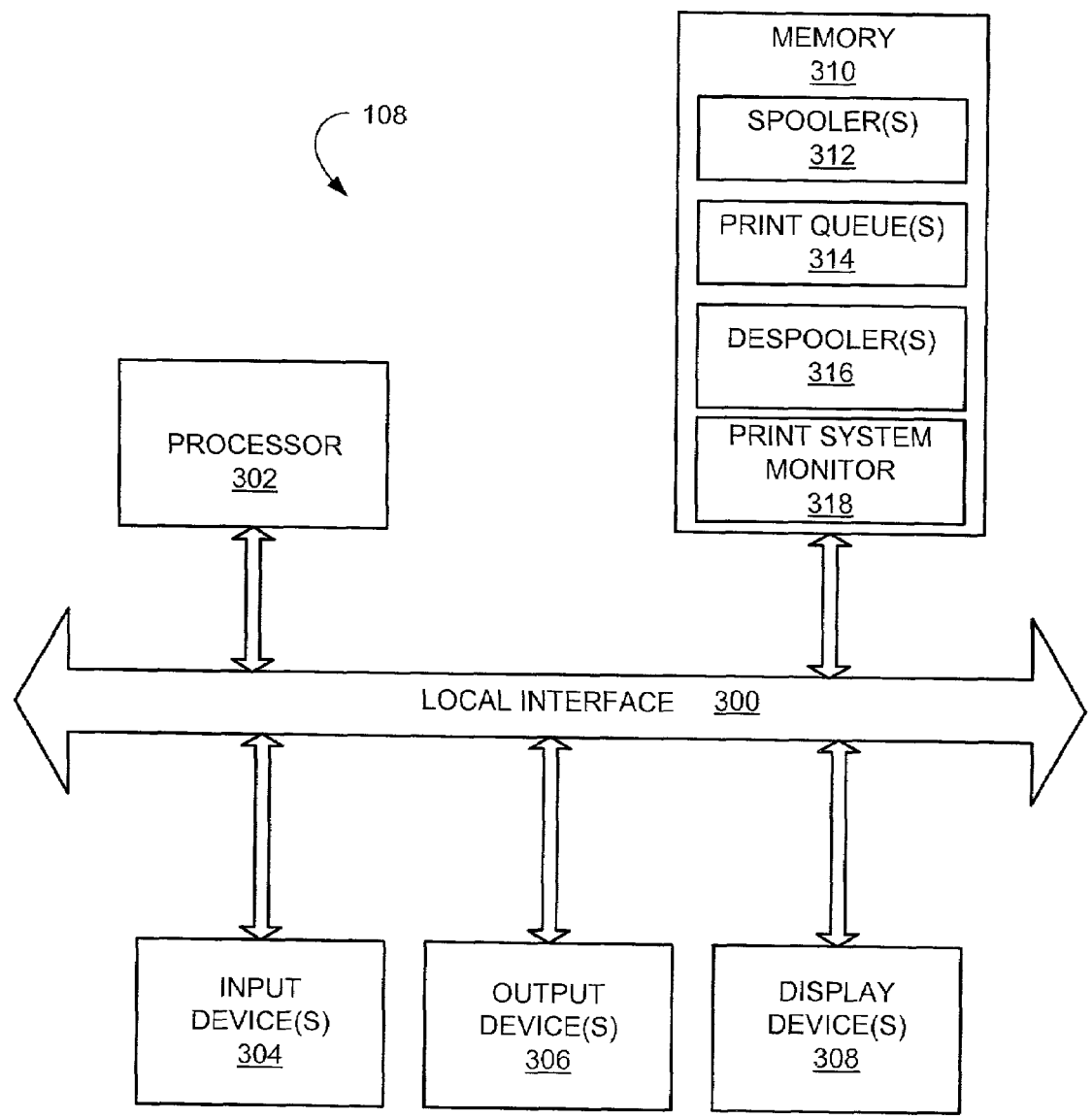
FIG. 3 is a block diagram of a print server connected to the network system of FIG. 1.

FIG. 3 illustrates an example configuration for the print server 108 shown in FIG. 1. As with the computing device 104, the print server 108 normally comprises a local interface 300, a processor 302, input device(s) 304, output device(s) 306, and display device(s) 308. Furthermore, the print server 108 includes a memory 310 that, like the memory 210 of the computing device 104 shown in FIG. 2, can comprise storage memory and system memory. Therefore, as with the computing device 104, the memory 210 of the print server 108 can comprise one or more hard drives as well as system RAM. Normally, the memory 310 comprises one or more spoolers 312, one or more print queues 314, one or more despoolers 316, and a print system monitor 318.

As is known in the art, the spooler 312 is capable of receiving print data from the printer driver of one or more of the computing devices 104 connected to the network system 100. The spooler is configured to spool this data into a spool file that can be provided to the print queue 314. In the print queue 314, the spool file awaits its turn and ultimately is despooled by the despooler 316 which conveys the print data, normally in packet form, to the selected printer 110. The print system monitor 318 normally comprises software located within the print server 108 that is responsible for communicating with the various print system components and collecting "health" information about the various system components. As will be understood from the discussion that follows, the print system monitor 318 compiles this health data and conveys it in a user-friendly format to the user (e.g., a network administrator), to inform the user as to the details of print system conditions and capacity. As will be understood by persons having ordinary skill in the art, the print system monitor 318 can be stored and transported on any computer readable medium for use by or in connection with an instruction execution system, apparatus, or device, such that a computer-based system, processor containing system, or other system can fetch the instructions from the instruction execution system, apparatus, or device and execute the instructions.

In the context of this disclosure, a "computer readable medium" can be a means that can contain, store, communicate, propagate, or transport the program for use by or in connection with the instruction execution system, apparatus or device. A compute readable medium can be, for example, an electronic, magnetic, optical, electromagnetic, infrared, or semiconductor system, apparatus, device, or propagation medium. More specific examples of compute readable media include the following: an electrical connection having one or more wires, camera memory card, affordable computer diskette, a random access memory (RAM), a read only memory (ROM), an erasable programmable read only memory (EPROM or Flash memory), an optical fiber, and a portable compact disk read only memory (CD ROM). It is to be noted that the computer readable medium can even be paper or another suitable medium upon which the program is printed as the program can be electronically captured, via for instance optical scanning of the paper or other medium, then compiled, interpreted, or otherwise processed in a suitable manner if necessary, and then stored in a computer memory.

Figure 4:
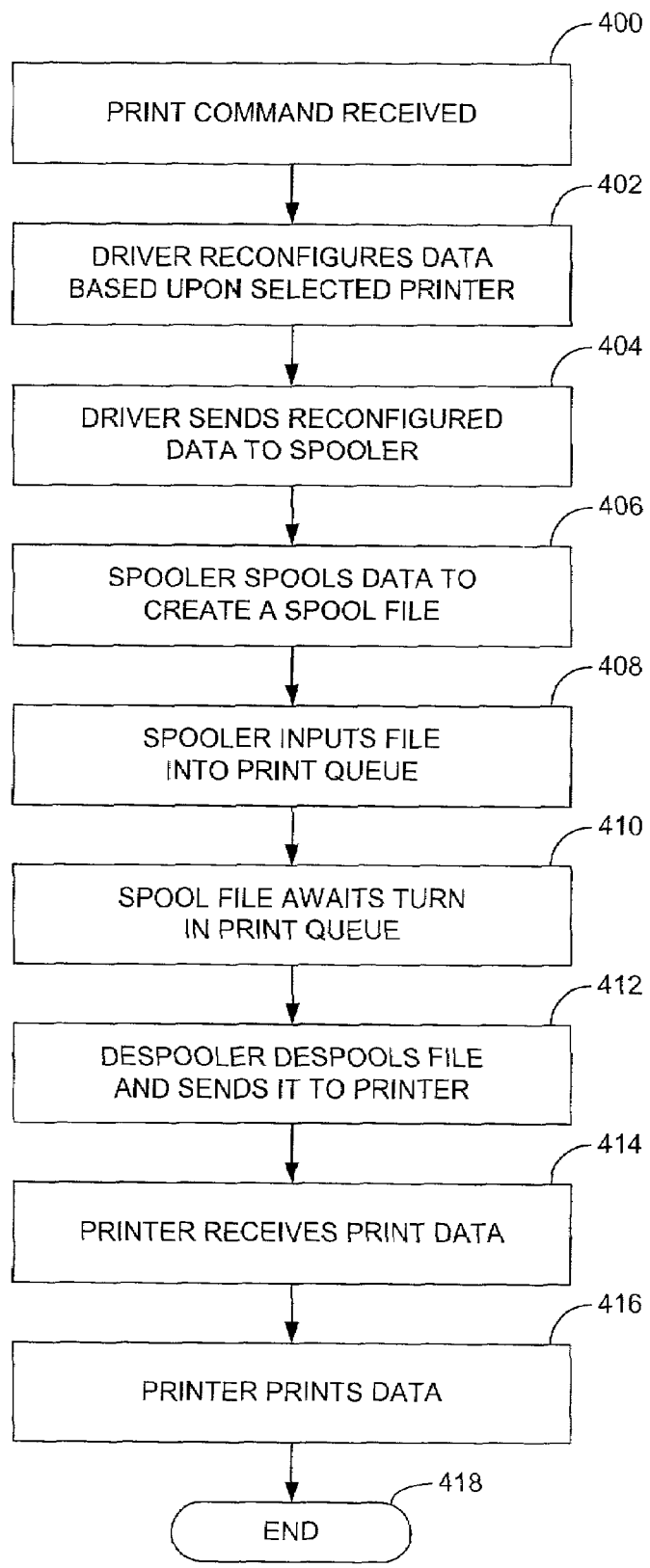
FIG. 4 is a flow diagram of an example printing sequence.

FIG. 4 illustrates an example printing sequence used in the network system 100 shown in FIG. 1. It will be understood that this printing sequence is provided by way of example only and that alternative sequences are feasible. As indicated in block 400, a print command is first received by the print system. By way of example, this print command can be a command input via application software (e.g., word processor). If a printer has not already been designated within the application, the user will be prompted to select a printer to which to direct the print job. Once this printer has been selected, the printer driver 214 for that designated printer reconfigures the data, as indicated in block 402, so that data can be understood by the printer. As indicated in block 404, the driver sends the reconfigured data to the spooler 312 located within the print server 108 (FIG. 3).

Once the data is received by the spooler 312, the spooler spools the data to form a spool file, as indicated in block 406, and inputs the spool file into the print queue 314, as indicated in block 408. The spool file then awaits its turn within the print queue 314 as indicated in block 410. The spool files contained within the print queue 314 normally include the data to be printed by the printer as well as various data regarding the printer to which the data is to be directed and the user that sent the data. The despooler 316 is responsible for scheduling the distribution of the spool files to the various printers. Normally, the spool files are sent to these printers according to a first in, first out (FIFO) sequence. Alternatively, the spool files can be sent from the print queue 314 according to other hierarchical parameters. For instance, the spool files of particular network users can be given precedence of those of other users, etc.

Irrespective of the particular order with which the spool files are arranged within the print queue 314, the despooler 316 is used to despool the files and send them to the intended printers as indicated in block 412. Normally, the print data is divided into a plurality of packets of data that are transferred from the queue 314 to the printer by the despooler 316. During this transfer, the despooler 316 monitors the progression of the packets and monitors the time elapsed from the initiation of sending of the packets to the printer. By tracking this time, the despooler 316 can time-out if the transmission is not completed within a predetermined duration.

As indicated in block 414, the printer receives the print data and, as indicated in block 416, prints the data out as a hard copy. Normally, the print job is considered complete upon the transfer of the last packet of print data to the printer. In more sophisticated systems, however, the printer tracks the printing progress and indicates job completion only after the final page of the job has been output. Optionally, a printing complete notice can be conveyed to the sender. Once the print data has been delivered to the printer, the data pertaining to this job is typically deleted from the queue 314 to provide space for new print jobs. When printing is completed, flow is terminated as indicated in 418.

Figure 5:
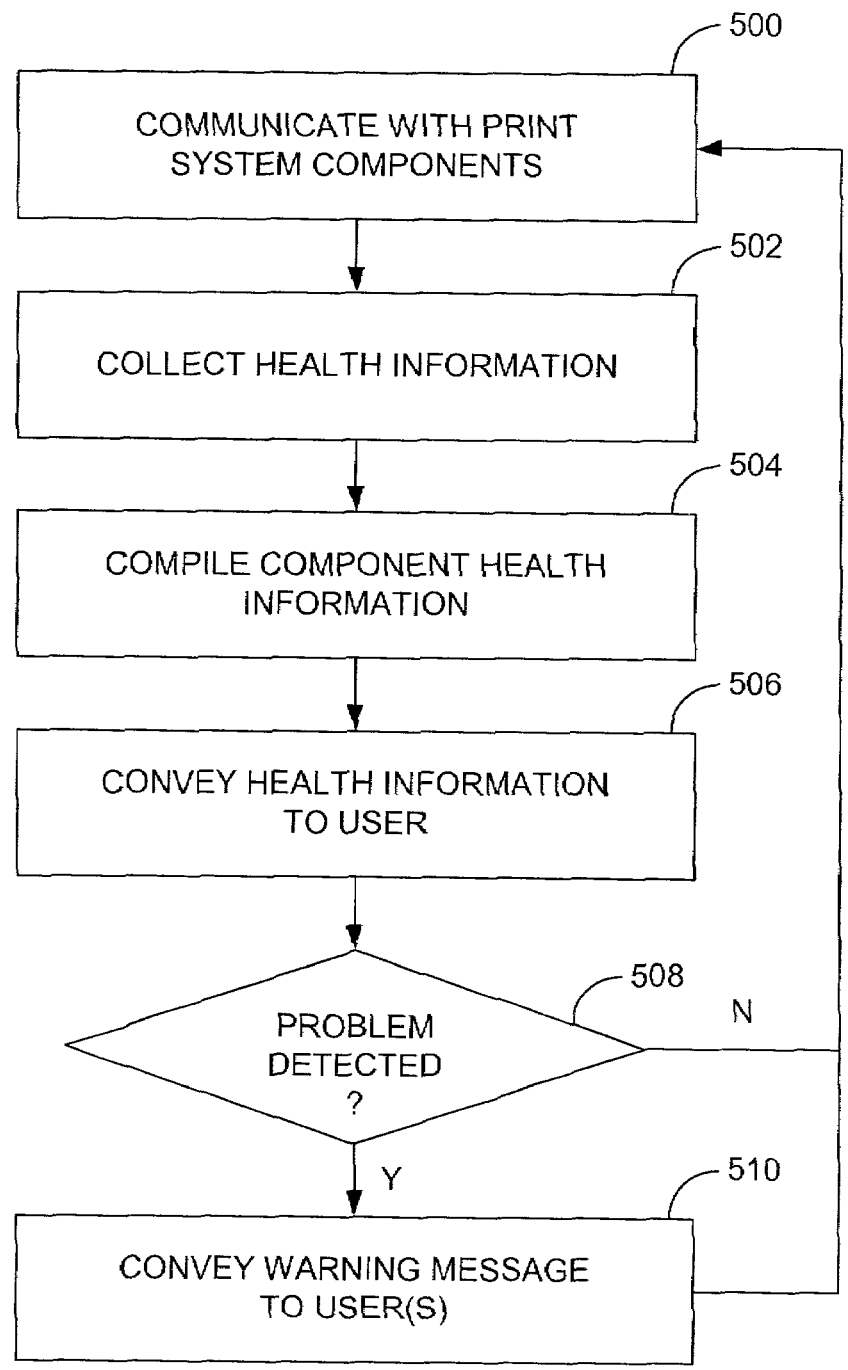
FIG. 5 is a flow diagram of a method for monitoring a print system of the present invention.

FIG. 5 illustrates a method for monitoring a print system of the present invention. As indicated in block 500, print system monitor 318 communicates with the components of the print system to gauge their health and operability. In particular, as indicated in block 502, the print system monitor 318 collects the health information from the system components so that a determination can be made as to the operability of each of these components individually. Health information can be collected on a periodic basis thru-out a print job or during print idle time. In addition, some of the components can have an alert notification functionality with which the component can communicate problems to user. Normally, the alarms are adapted to trigger when a threshold event occurs.

Normally, print system health determinations are made in conjunction with the device monitoring software 216 located on each computing device 104 as well as the spoolers 312, print queues 314, and despoolers 316 located on the print server 108. As identified above, the device monitoring software 214 tracks the performance of the communications of the computing device 104. Preferably, the device monitoring software 216 tracks how often the signals transmitted by the computing device 104 are interrupted during transmission. For example, where the network system 100 operates with an Ethernet networking protocol, the device monitoring software 216 tracks the percentage of data packets that collide with other packets transmitted across network system 100. This information can be shared with the print system monitor 318 as part of the information concerning the health of the print system.

As is known in the art, each of the spooler 312, print queue 314, and despooler 315 similarly tracks their own performance. For instance, the spooler 312 typically keeps track of the duration of time required to spool files, the speed with which print jobs are received versus sent to the queue 314, etc. The print queue 314 normally monitors its capacity at any given time. The despooler 316 typically monitors the time with which it takes to transfer print data from the queue 314 to the printer. In some configurations, the printer 110 has similar monitoring capabilities. With this information collected by the device monitoring software 216, spooler 312, print queue 314, and despooler 316 being communicated to the print system monitor 318, the print system monitor can make a determination as to the health of each of these print system components. For instance, where the device monitoring software 216 indicates that a high percentage of print data packets are colliding with other data packets traveling along the network system 100, the print system monitor 318 can be apprised of this condition. Normally, predetermined thresholds can be set within the print system monitor 318 to identify a fault condition that can be noted by the print system monitor 318 as an indication of poor print system health. In similar manner, where a predetermined capacity of the print queue 314 is exceeded, for instance, 90% of total capacity, a poor health determination of the print queue 314 can be noted by the print system monitor 318 as a further indication of poor print system performance. In another example, long data transfer durations from the print queue 314 to the printer by the despooler 316 can identify problems with the printer or the despooler. Accordingly, the print system monitor 318 is configured to receive data from each of the print system components to identify problems as well as component performance so that component health determinations can be made.

In an alternative arrangement, the print system monitor 318 can comprise a device administrator, for instance Hewlett-Packard's Web JetAdmin®, that is used to collect such information from the various components. Accordingly, in such an arrangement, the print system monitor 318 that interacts with the device administrator has the responsibility of directly communicating with each of the print system components. Normally, such a device administrator comprises software that periodically confers with each of the system components to collect information as to component performance.

Returning to FIG. 5, the component health information is compiled by the print system monitor 318 as indicated in block 504. Once this information has been compiled, it is conveyed to the user, for instance a network administrator, as indicated in block 506. Normally, this information is conveyed through a graphical user interface (GUI) (not shown) that is displayed on a monitor connected to the print server 108. Through this GUI, the user can simultaneously review performance information as to each of the print system components and can therefore easily identify weak links of the print system so that printing problems can be rectified or avoided. Accordingly, through the use of the print system monitor 318, the user can be provided with a "snapshot" that summarizes print system performance as a whole as well as the performance of the individual components of the print system without the need for making individual inquiries of each component of the print system manually.

Where system performance falls below a predetermined threshold established with the print system monitor 318, as indicated at 508, flow continues to block 510 and a warning message is conveyed to the user. Such warnings can be conveyed via a pop-up message box provided to the print job sender and/or network administrator. In another example, an e-mail message can be delivered to the sender and/or network administrator. In either case, the message normally comprises information as to the specific print system component that is not operating at the desired performance level. Accordingly, through this messaging, the sender or network administrator can immediately be provided with information as to a print system condition that is creating performance problems with the print system. Therefore, arrangements can then be made to correct or prevent any such problem in an expeditious manner.

Optionally, the print system monitor 318 can be configured to automatically send a message to a remote service provider. In such an embodiment, the print system monitor 318 can comprise a diagnostic tool which sends a message to the printer manufacturer to alert the manufacturer of a problem concerning the printer and/or print system. For instance, where the printer driver 214 used in the print system is outdated, the manufacturer can be alerted of this condition so that the manufacturer can communicate to the user that an updated and more efficient driver is available for the particular printer.

In addition to identifying print system performance difficulties, the print system monitor 318 can further be configured to alert users of changed conditions of the print system. For instance, where a printer connected to the network system 100 has been replaced with a different model printer having the same network address, the print system monitor 318 can alert a user that sends a print job to the new printer that the printer has been changed and that the output format from the printer may be different than the sender expects. Therefore, it is to be understood that the print system monitor 318 can be configured in a variety of different ways so as to monitor all aspects of print system function and performance so as to consolidate this information for a user and apprise users of any conditions that may be important to the user.

With reference back to FIG. 5, if no problems are detected at 508, or after warning messages relating to these problems have been sent as indicated in block 510, flow returns to block 500 where the print system monitor 318 again communicates with the print system components to gauge their health. Preferably, such communication is made with these components on a periodic basis so that up-to-date status information can be collected and conveyed to the user.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for monitoring a print system, comprising:
communicating with each of a spooler, a print queue, and a despooler of the print system using a print system monitor;
collecting non-failure related health information regarding operation of each of the spooler, the print queue, and the despooler using the print system monitor;
compiling the health information regarding the operation of each of the spooler, the print queue, and the despooler using the print system monitor; and
conveying using the print system monitor the health information regarding the operation of each of the spooler, the print queue, and the despooler to a user in a single interface that provides a snapshot of the health of the print system such that the user can identify conditions that may adversely affect print system performance by referencing the interface.

2. The method of claim 1, further comprising the print system monitor automatically sending a warning message to a remote service provider when the health of any print system component falls below a predetermined threshold.

3. The method of claim 1, wherein the print system monitor executes on a print server.

4. The method of claim 1, further comprising communicating with device monitoring software of a computing device using the print system monitor, wherein the device monitoring software tracks performance of communications sent by the computing device, and further conveying communication performance information to the user with the interface.

5. The method of claim 4, wherein conveying communication performance information comprises conveying information about how often signals transmitted by the computing device are interrupted during transmission.

6. The method of claim 1, wherein collecting non-failure related health information comprises communicating with a despooler and receiving from the despooler information about the time it takes to transfer print data from a print queue to a printer.

7. The method of claim 1, wherein collecting non-failure related health information comprises receiving from the print queue information about an available capacity of the print queue.

8. The method of claim 1, further comprising the print system monitor displaying a pop-up message to the user when the health of any print system component falls below a predetermined threshold.

9. The method of claim 1, further comprising the print system monitor sending an email message to the user when the health of any print system component falls below a predetermined threshold.

10. The method of claim 1, further comprising receiving information from a remote service provider regarding print system performance.

11. The method of claim 1, wherein collecting non-failure related health information comprises receiving from the spooler information about a duration of time required to spool files.

12. The method of claim 1, wherein collecting non-failure related health information comprises receiving from the spooler information about a speed with which print jobs are received versus sent to a print queue.

13. A print system, comprising:
a spooler;
a print queue;
a despooler; and
a print system monitor in communication with each of the spooler, print queue, and despooler and configured to collect non-failure related health information as to operation of each of the spooler, print queue, and despooler, the print system monitor further configured to convey the health information to a user in a single interface that provides a snapshot of the health of the print system such that the user can identify conditions that may adversely affect print system performance by referencing the interface.

14. The system of claim 13, wherein the print system monitor is further in communication with device monitoring software that executes on a user computing device and that tracks performance of communications sent by the computing device, wherein the print system monitor is further configured to convey communication performance information to the user with the interface.

15. A computer-readable memory comprising:
logic configured to communicate with each of a spooler, a print queue, and a despooler of a print system using a print system monitor;
logic configured to collect non-failure related health information regarding operation of each of the spooler, the print queue, and the despooler using the print system monitor;
logic configured to compile the health information regarding the operation of each of the spooler, the print queue, and the despooler using the print system monitor; and
logic configured to convey the health information regarding the operation of each of the spooler, the print queue, and the despooler using the print system monitor to a user in a single interface that provides a snapshot of the health of the print system such that the user can identify conditions that may adversely affect print system performance by referencing the interface.

16. The computer-readable memory of claim 15, wherein the logic configured to convey the health information is configured to convey information about a duration of time required to spool files.

17. The computer-readable memory of claim 15, wherein the logic configured to convey the health information is configured to convey information about a speed with which print jobs are received versus sent to a print queue.

18. The computer-readable memory of claim 15, wherein the logic configured to convey the health information is configured to convey information about how often signals transmitted by the computing device are interrupted during transmission.

19. The computer-readable memory of claim 15, wherein the logic configured to convey the health information is configured to convey information about an available capacity of the print queue.

20. The computer-readable memory of claim 15, wherein the logic configured to convey the health information is configured to convey information about the time it takes to transfer print data from a print queue to a printer.

* * * * *

UNITED STATES PATENT AND TRADEMARK OFFICE
CERTIFICATE OF CORRECTION

| | | |
|---|---|---|
| PATENT NO. | : 7,265,819 B2 | Page 1 of 1 |
| APPLICATION NO. | : 09/728046 | |
| DATED | : September 4, 2007 | |
| INVENTOR(S) | : Alan L. Raney | |

It is certified that error appears in the above-identified patent and that said Letters Patent is hereby corrected as shown below:

In column 1, line 14, delete "Modem" and insert -- Modern --, therefor.

Signed and Sealed this

Twenty-fourth Day of June, 2008

JON W. DUDAS
*Director of the United States Patent and Trademark Office*